United States Patent [19]

Rajasekaran et al.

[11] 4,061,187

[45] Dec. 6, 1977

[54] DUAL COOLING SYSTEM

[75] Inventors: Ramanujam Rajasekaran; Dennis O. Taylor; James W. Whittlesey, all of Columbus, Ind.

[73] Assignee: Cummins Engine Company, Inc., Columbus, Ind.

[21] Appl. No.: 681,492

[22] Filed: Apr. 29, 1976

[51] Int. Cl.² .......................... F28D 15/00; F01P 3/12
[52] U.S. Cl. ................................ 165/107; 123/41.29; 123/41.31; 123/41.47; 123/41.54
[58] Field of Search ............... 165/51, 107; 123/41.29, 123/41.31–41.33, 41.54, 41.44, 41.46, 41.47

[56] References Cited

U.S. PATENT DOCUMENTS

| | | | |
|---|---|---|---|
| 1,985,240 | 12/1934 | Brubaker | 123/41.29 |
| 2,216,802 | 10/1940 | Baster | 123/41.29 X |
| 2,262,659 | 11/1941 | Ware | 123/41.29 X |
| 3,989,103 | 11/1976 | Cieszko | 123/41.54 X |

FOREIGN PATENT DOCUMENTS

| | | | |
|---|---|---|---|
| 1,308,336 | 9/1962 | France | 123/41.31 |
| 871,659 | 5/1953 | Germany | 123/41.31 |

*Primary Examiner*—Albert W. Davis, Jr.
*Attorney, Agent, or Firm*—Neuman, Williams, Anderson & Olson

[57] ABSTRACT

A dual cooling system for an engine is provided which embodies two independent circuits for a liquid coolant. The temperature of the coolant in one circuit is different than that of the coolant in the other circuit. A pump impeller means is provided for each circuit and both impeller means are actuated by a common drive means. Limited coolant migration between the circuits is effected during actuation of the impeller means. A coolant make-up means is connected to each circuit at the inlet side of the pump impeller means.

7 Claims, 4 Drawing Figures

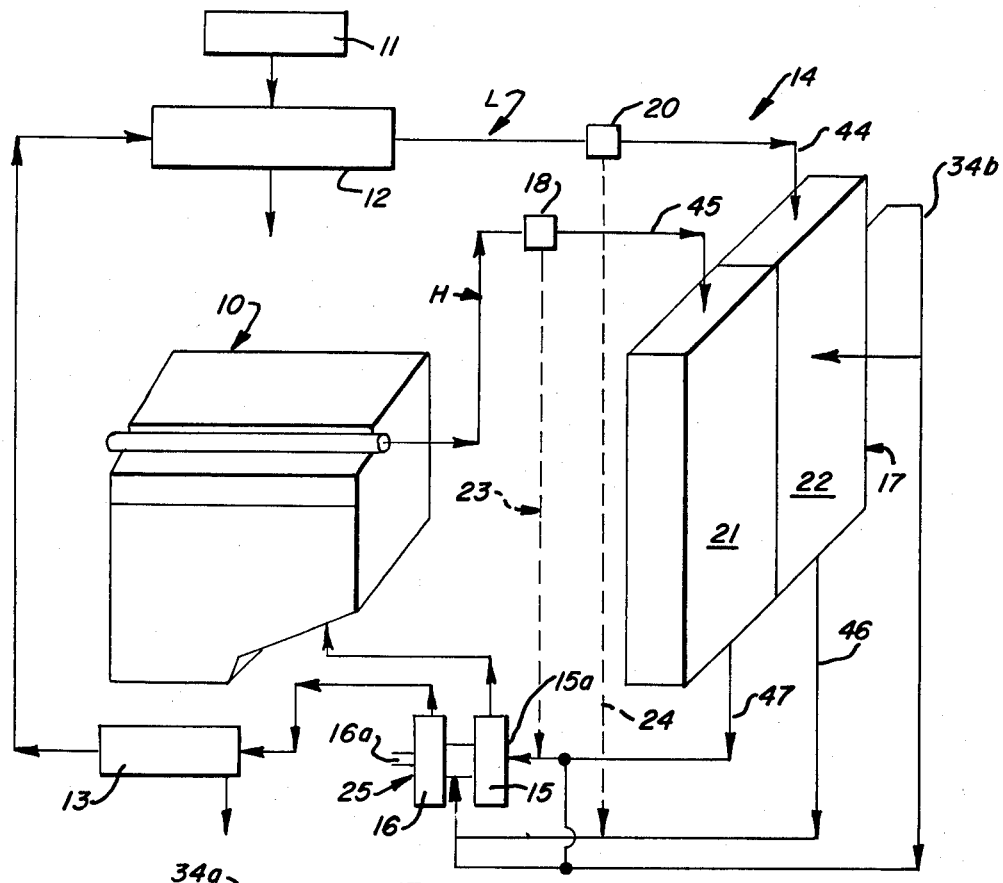
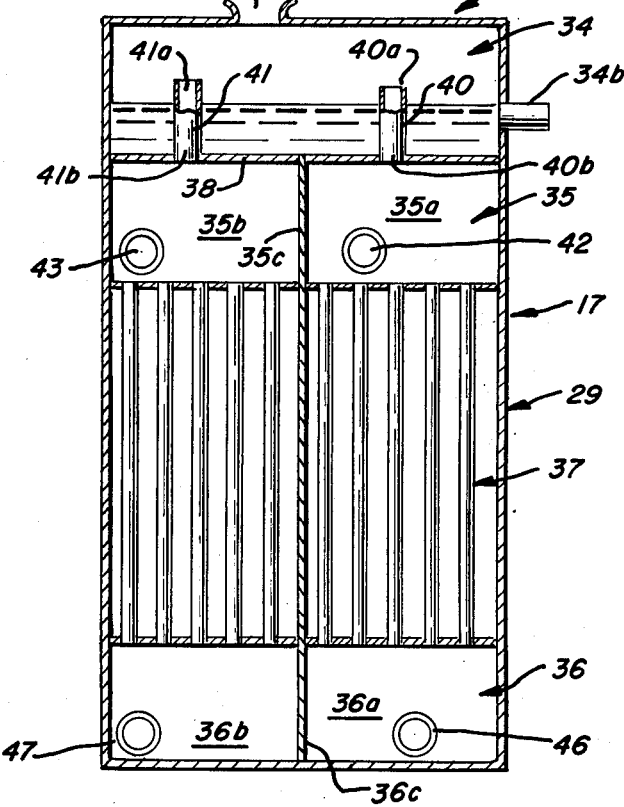
FIG. 1
FIG. 4

DUAL COOLING SYSTEM

BACKGROUND OF THE INVENTION

In the operation of diesel engines utilizing turbochargers embodying intercoolers and/or oil coolers, it is highly desirable that the temperature of the coolant for the engine block remains at a high level while at the same time the temperature of the coolant for the oil cooler and/or intercooler remains at a low level. By maintaining at a high level the temperature of the engine block coolant, the size and/or the cooling air fan power requirements of the radiator can be reduced thereby generally enhancing the operating efficiency of the engine. On the other hand, maintaining a low temperature level of the coolant for the intercooler and/or oil cooler results in significant improvement in the performance of the turbocharger compressor; in the fuel consumption of the engine; and in reducing gaseous emissions from the engine.

To achieve these results, various dual cooling systems have heretofore been provided; however, because of certain design characteristics they have been beset with one or more of the following shortcomings: a) the system was of a complex and costly construction and was susceptible to malfunction; b) it was difficult to maintain the proper temperature differential as to the liquid coolant flowing in the two circuits of the system; and c) the system was ineffective and inefficient in operation.

SUMMARY OF THE INVENTION

Thus, it is an object of the invention to provide a dual cooling system which avoids the shortcomings associated with prior systems.

It is a further object of the invention to provide a dual cooling system which is of simple, compact construction and is capable of being used on a variety of engines.

Further and additional objects will appear from the description, accompanying drawings, and appended claims.

In accordance with one embodiment of the invention a dual cooling system is provided which includes a pair of closed circuits through which liquid coolant flows. Temperature, flow and pressure differentials are maintained between the coolant flowing through the several circuits. Each circuit is provided with a pump chamber, an impeller therefor, and heat exchange means. Means is provided for limited coolant migration between the pump chambers. A coolant make-up means is also provided which communicates with both circuits. The pump chambers are in contiguous relation and separated from one another by a common partition. The impellers for the pump chambers are mounted on a common drive shaft which extends theough an opening formed in the partition.

DESCRIPTION

For a more complete understanding of the invention reference should be made to the drawings wherein:

FIG. 1 is a schematic view of a diesel engine with a turbocharger and showing the improved dual cooling system associated therewith.

FIG. 4 is a vertical sectional view of one form of a radiator and expansion tank assembly utilized in the improved dual cooling system.

Figure 2:
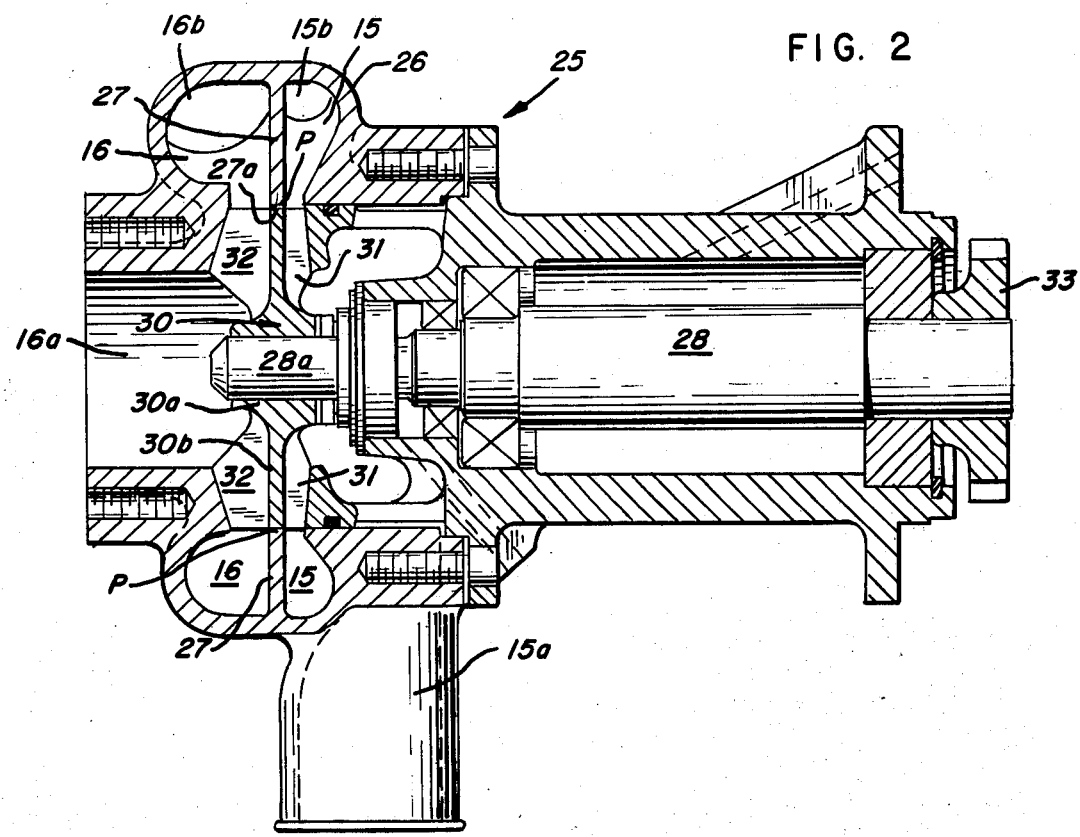
FIG. 2 is an enlarged fragmentary, longitudinal sectional view of one form of an assembly of the impeller means and pump chambers embodied in the improved dual cooling system.

Referring now to the drawings and more particularly to FIG. 1, a diesel engine 10 is diagrammatically shown which has associated therewith a turbocharger assembly 11 including an intercooler 12 and an oil cooler 13. The engine 10 and the turbocharger 11 are shown in combination with one form of the improved dual cooling system 14. The cooling system 14, as shown in FIG. 2, includes a pair of pump chambers 15 and 16 in which are disposed suitable impeller means; a radiator and expansion tank assembly 17; and thermostats 18 and 20. Assembly 17 has a high temperature section 21 and a low temperature section 22. The sections are adapted to maintain a temperature differential (e.g. 70°–80° F) between the coolant flowing therethrough.

The system 14 embodies a pair of closed circuits (H) and (L), one (H) for a high temperature coolant and the other (L) for a low temperature coolant. The high temperature circuit includes the conventional internal cooling system within the block and head of the engine 10, pump chamber 15, high temperature section 21 of the assembly 17, thermostat 18, and a by-pass section 23 which interconnects the thermostat 18 with the inlet side of the chamber 15 and circumvents the section 21.

The low temperature circuit (L), on the other hand, includes pump chamber 16, oil cooler 13, intercooler 12, thermostat 20, the low temperature section 22 of the assembly 17, and a by-pass section 24 which interconnects the thermostat 20 with the inlet side of chamber 16. The cooling system design is such that for the high temperature circuit (H) the maximum design coolant temperature (e.g., 230° F) is achieved at design full load engine operating condition at a design ambient temperature (e.g., 100° F).

The setting of thermostat 18 is normally chosen to control the operating temperature of the coolant at or near the desired design temperature (e.g., 230° F) for engine loads and ambient temperatures less severe than the design condition. For the low temperature circuit (L) the design is such that the maximum coolant temperature (e.g., 160° F) is achieved at design full load engine operating condition at a design ambient temperature (e.g., 100° F). The setting of thermostat 20 is such as to limit the minimum temperature (e.g., 100° F) of the coolant at the outlet of the intercoolant 12.

The heat generated by the engine and absorbed by the coolant flowing through the high temperature circuit (H) is dissipated to the atmosphere in section 21 of the assembly 17. In a similar manner, the heat absorbed by the coolant flowing through the low temperature circuit (L) is dissipated to the atmosphere in section 22 of the assembly 17. As aforementioned, thermostat 18 may be preset so that the coolant at the inlet to the section 21 will maintain a temperature of 230° F which is higher than the conventional temperature of the coolant at such a location. Thermostat 20 also will normally be preset so as to allow a lower than conventional temperature (e.g. 160° F) of the coolant in the low temperature circuit (L) as it leaves the intercooler 12. It has been found that maintaining a low temperature level for the coolant in circuit (L) results in significant improvement in the performance of the turbocharger compressor, a reduction in fuel consumption, and a reduction in gaseous emissions from the engine.

The settings of the thermostats 18 and 20 will depend upon the type and size of the engine 10, the turbocharger 11, and the assembly 17 being utilized.

One form of pump 25 utilized in the improved dual cooling system 14 is shown in greater detail in FIG. 2. Pump 25 embodies a housing 26 having the interior thereof formed into a pair of pump chambers 15 and 16. As seen in FIG. 1, pump chamber 15 comprises a part of the high temperature circuit (H), and chamber 16 comprises a pair of the low temperature circuit (L). The two chambers are separated from one another by an internal partition 27. Rotatably mounted within housing 26 is an elongated shaft 28. One end 28a of the shaft terminates within the housing and has mounted thereon in a conventional manner, a dual impeller 30. A suitable central opening 27a is formed in partition 27 to accommodate the impeller 30.

The dual impeller 30 is provided with a hub 30a which encompasses and is secured to the end 28a of the shaft. Affixed to and extending radially from the hub 30a is an annular imperforate plate partition member 30b. As seen in FIG. 2, the thickness of member 30b preferably approximates that of partition 27. The external diameter of member 30b is close to the diameter of the partition opening 27a. It is important, however, that there be only a limited clearance between the partition and the plate member so as to limit limited coolant migration between the chambers 15 and 16 to a restricted passageway P between the partitions 27, 30b.

Symmetrically arranged on each face of plate member 30b and projecting therefrom are a plurality of vanes 31 and 32. Vanes 31, in the illustrated embodiment, are smaller than vanes 32 and are disposed within chamber 125. Vanes 32, in turn, are disposed within chamber 26. In both instances the vanes are located between the inlet 15a, 16a and the outlet 15b, 16b for the chamber 15, 16. The shape, size and number of vanes disposed in a chamber will depend upon the type of coolant utilized, the desired flow rate of the coolant, and the configuration of the pump chamber.

The pump 25 is provided with the necessary seals and bearings for the shaft 28. As shown in FIG. 2, the shaft is driven through a suitable gear or the like 33 mounted on the end 28b of the shaft which is opposite the end 28a carrying the impeller 30. Thus, in pump 25 a single shaft 28 and impeller 30 are utilized to effect simultaneously coolant flow through both circuits (H) and (L) and, yet, the flow rate in each circuit is different.

Figure 3:
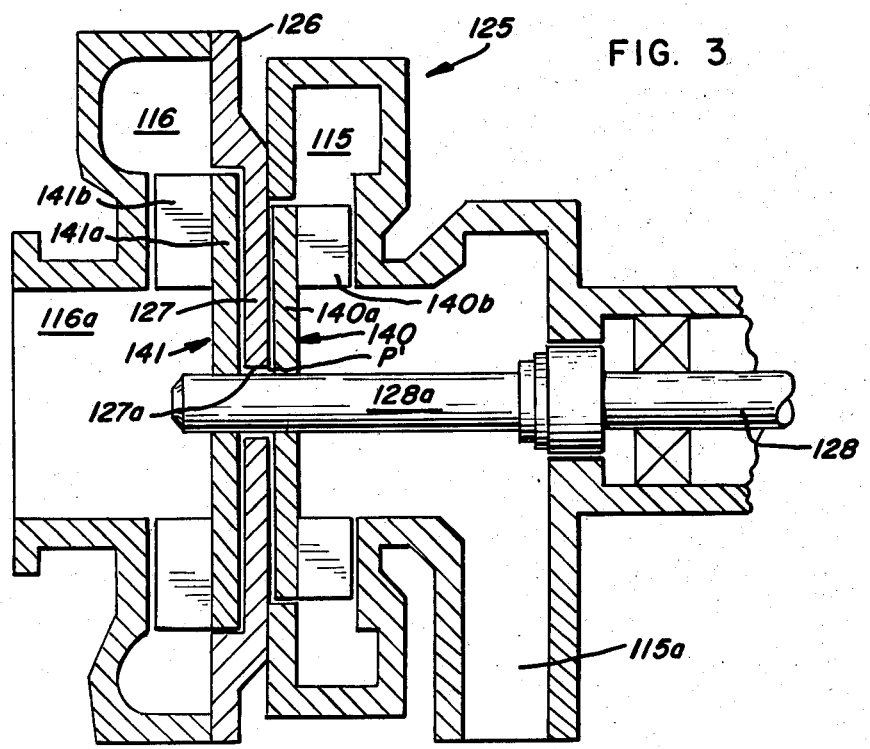
FIG. 3 is similar to FIG. 2 but showing a second form of an impeller means and pump chambers assembly.

FIG. 3 illustrates a modified pump 125 which is similar in many respects to pump 25. In order to more readily ascertain the likenesses of the two pumps, the corresponding parts of pump 125 will be identified by the same number but in the one hundred series. In pump 125, as seen in FIG. 3, the partition 127 formed within the housing 126, extends to the end portion 128a of the drive shaft 128, because in place of the dual impeller 30 of pump 25, a pair of separate impellers 140, 141 are utilized which are mounted in longitudinally spaced relation on the shaft end portion 128a. It will be noted that the opening 127a formed in partition 127 is slightly larger than the diameter of shaft end portion 128a so as to form a passageway P' to permit limited coolant migration between the pump chambers 115 and 116 formed within the housing. Each of the impellers 140, 141 includes the same basic components; namely, a plate member or spider 140a, 141a, which is disposed completely within the respective pump chamber, and a plurality of vanes 140b and 141b protruding from the plate member 140a, 141a. In each instance the vanes are positioned intermediate the inlet and outlet for the chamber. As will be noted in FIG. 3, impeller 141 is of greater size than impeller 140. The comparative size and shape of impellers 140, 141 may vary, if desired, from that shown.

FIG. 4 discloses one embodiment of the assembly 17 which may be utilized with both the high temperature and low temperature circuits (H), (L) as seen in FIG. 1. Assembly 17 includes a split core type radiator 29 having a single expansion tank 34 mounted thereon. Tank 34, as seen in FIG. 4, is mounted on and positioned above an inlet header 35 of the radiator 29. The inlet header 35, in turn, is positioned above and connected to an outlet header 36 by a plurality of elongated substantially parallel tubes 37, the latter being subjected to a flow of cooling air. The headers 35, 36 and tubes 37 comprise the basic components of radiator 29.

While the expansion tank 34 is shown mounted on the inlet header 35 and separated therefrom by a wall 38, it should be noted that said tank may be remote from the inlet header and connected thereto by suitable vent tubing as will be described hereinafter. Furthermore, while the core sections 37a and 37b of the radiator are shown disposed in side by side relation, the arrangement thereof may be varied without departing from the scope of the invention so that they are disposed front and back or over and under with respect to one another.

Disposed within the interior of tank 34 are a pair of upright, laterally spaced vent tubes 40, 41. The upper ends 40a, 41a of the tubes are open and define a predetermined horizontal plane disposed at approximately mid-height of the tank interior. The plane is chosen such that an airlock is prevented during cooling system fill operation. The lower end 40b of tube 40 communicates with one section 35a of inlet header 35 through an opening formed in the separating wall 38. In a similar manner, the lower end 41b of tube 41 communicates with a second section 35b of the inlet header through a second opening formed in separating wall 38. The sections 35a, 35b are segregated from one another by an upright divided wall 35c which is imperforate and extends the full height of the inlet header. The lengths of the vent tubes 40, 41 will depend upon the relative position of the expansion tank 34 with respect to the inlet header 35 of the radiator 29.

It will be noted in the expansion tank 34 there is no wall separating the upper ends 40a, 41a of the vent tubes from one another. By reason of this fact, a common coolant may be utilized for both circuits (H), (L). In order to make up any coolant which might have been dissipated or lost within either or both circuits, additional coolant may be introduced into the circuits through a filler hole 34a provided in the upper wall of the tank. The filler hole is normally closed by a pressure cap or the like, not shown. A fill tube 34b is also provided in the side wall of tank 34, see FIG. 4. The fill tube is disposed beneath the horizontal plane formed by the upper ends 40a, 41a of the vent tubes and is in communication with the circuits (H), (L).

The inlet header sections 35a, 35b are connected to the respective circuits (L), (H) by means of inlet ports 42, 43. As noted in FIG. 1, inlet port 42 is connected by pipe section 44 to thermostat 20; in a similar manner, inlet port 43 is connected by pipe section 45 to thermostat 18.

The fill tube 34b extending from the side of the expansion tank 34 is preferably connected to the lowest point in both circuits which normally occurs at the inlets to pump 25. Thus, by reason of this arrangement (e.g. the expansion tank 34, filler hole 34a, vent tubes 40, 41, and fill tube 34b) rapid refilling of the systems with a liquid coolant can be accomplished without causing an airlock. Thus, as the liquid coolant is replenished in the circuits air or other gases entrained within the coolant are forced up and out of the circuits through the vent tubes 40, 41 and the filler hole 34a. The primary function therefore of the vent tubes 40, 41 is to enable the transfer to tank 34 of the coolant and/or the gases entrained therein without causing further agitation of the coolant already accumulated in the tank. In certain instances where one or both of the thermostats 18, 20 are located at the highest point in a circuit, an auxilliary vent line, not shown, may be connected to the expansion tank 34.

As noted in FIG. 4, the coolant disposed within inlet header sections 35a, 35b, flows therefrom through the vertically disposed tubes 37 into the corresponding sections 36a, 36b, the latter being formed in the outlet header 36 by means of an imperforate divider wall 36c extending the full height of the outlet header 36. Discharge pipes 46, 47 are connected to header sections 36a 36b, respectively, and, as seen in FIG. 1, interconnect outlet header section 36a to the inlet 15a of pump chamber 15, and outlet head section 36b to the inlet 16a of the pump chamber 16.

While the high temperature and low temperature sections 21, 22 are described as being disposed within a single assembly 17, it is not essential that they be so arranged, but if desired, they may be disposed independently and in spaced relation to one another. In such a modified arrangement, individual expansion tanks may be utilized.

Thus, with an arrangement of a single or two expansion tanks within the circuits, a means is provided, during operation of the dual system, enabling a predetermined locations (e.g. expansion tank and passageway P or P') intermingling of the coolant between circuits (H), (L) and, yet, enabling the coolant at other crucial locations within the two circuits (e.g. engine 10, intercooler 12, and oil cooler 13) to retain their proper identity and differences in temperature and pressure. Furthermore, the pump utilized in the dual systems is of simple compact construction, effective in operation, and may be readily serviced when required.

We claim:

1. A dual cooling system for circulating coolant along discrete paths while maintaining the coolant in said paths at predetermined temperature and pressure differentials, said system comprising segregated circuits for the coolant; coolant circulating pump means including a housing defining a pump chamber in each circuit, a rotatable partition means encompassed along its annular periphery by a segment of said housing extending axially of the axis of rotation of said partition means at a greater radial distance from the said axis that the annular periphery of said rotatable partition means, said rotatable partition means being in at least partial registration with said housing segment and cooperating therewith to form a common partition intermediate said chambers, said common partition having a restrictive passage defined between the annular periphery of said rotatable partition means and the encompassing housing segment for limited coolant migration between said chambers in a direction substantially parallel to the axis of rotation of said partition means, impeller means extending into said chambers from opposite surfaces of said partition means to effect coolant circulation within said circuits at the predetermined temperature and pressure differentials when said partition means is rotated; means to effect rotation of said partition means; heat exchanger means disposed within each circuit; and coolant make-up means common to said circuits and connected to a suction side of each pump chamber to replenish any coolant migrating between said chambers, whereby said rotatable partition means is adapted to be positioned within said housing alone a predetermined axis of rotation, and the restrictive passage between said rotatable partition means and said housing segment separating said coolant circuits while permitting rotation of said rotatable partition means within said pump housing.

2. The dual cooling system of claim 1 wherein said impeller means includes a first set of vanes carried on one surface of said rotatable partition means and extending into one pump chamber, and a second set of vanes carried on a second surface of said rotatable partition means and extending into the other pump chamber.

3. The dual cooling system of claim 2, wherein the configuration of said first set of vanes differs from that of said second set of vanes.

4. The dual cooling system of claim 1 wherein the heat exchange means of said circuits communicate with said coolant make-up means.

5. The dual cooling system of claim 4 wherein said coolant make-up means includes a reservoir for accumulating therein coolant; a pair of tubular vents disposed in relatively spaced relation within said reservoir, a corresponding end of each vent opening at a common elevated predetermined horizontal plane within said reservoir whereby a space is provided therein above the level of the accumulated coolant, the opposite end of one vent communicating with an inlet for the heat exchange means in one closed circuit and the opposite end of the second vent communicating with an inlet for the heat exchange means in the second closed circuit; a first port formed in said reservoir and elevated relative to said predetermined horizontal plane; and a second port mounted on said reservoir and communicating with each of said circuits for replenishing the coolant in each circuit, said second port being disposed beneath said predetermined horizontal plane formed by said vent openings.

6. The dual cooling system of claim 1 wherein said coolant make-up means includes a coolant reservoir mounted on and in communication with an inlet header formed in each heat exchange means, the heat exchange means of each circuit being disposed contiguous to one another; communication between the inlet header of a heat exchange means and said coolant reservoir being effected by a tubular vent, the upper end of which is elevated relative to the bottom of said reservoir, the upper ends of said tubular vents being in spaced relation and defining a predetermined horizontal plane within said reservoir whereby a space is formed therein above said predetermined horizontal plane.

7. The dual cooling system of claim 1, wherein said means to effect rotation is a drive shaft attached to and extending from said rotatable partition means.

* * * * *

UNITED STATES PATENT AND TRADEMARK OFFICE
CERTIFICATE OF CORRECTION

PATENT NO. : 4,061,187

DATED : December 6, 1977

INVENTOR(S) : Ramanujam Rajasekaran, Dennis O. Taylor and James W. Whittlesey

It is certified that error appears in the above-identified patent and that said Letters Patent are hereby corrected as shown below:

Column 2, line 11 - "2" should be -- 1 --

Column 2, line 48 - "intercoolant" should be -- intercooler --

Column 3, line 10 - "pair" should be -- part --

Column 3, line 27 - delete "limited"

Column 3, line 34 - "125" should be -- 15 --

Column 3, line 35 - "26" should be -- 16 --

Column 5, line 27 - "head" should be -- header --

Column 5, line 38 - "a" should be -- at --

Column 5, line 58, claim 1 - "that" should be -- than --

Column 6, line 13, claim 1 - "alone" should be -- along --

Signed and Sealed this

Twenty-eighth Day of March 1978

[SEAL]

Attest:

RUTH C. MASON
*Attesting Officer*

LUTRELLE F. PARKER
*Acting Commissioner of Patents and Trademarks*